Nov. 13, 1956

M. T. WOBROCK 2,770,341

CLUTCH ASSEMBLY

Filed May 21, 1954

INVENTOR
Marvin T. Wobrock
BY L. D. Burel
ATTORNEY

Nov. 13, 1956  M. T. WOBROCK  2,770,341
CLUTCH ASSEMBLY
Filed May 21, 1954  2 Sheets-Sheet 2

INVENTOR
Marvin T. Wobrock
BY R. D. Burch
ATTORNEY

United States Patent Office 2,770,341
Patented Nov. 13, 1956

2,770,341

CLUTCH ASSEMBLY

Marvin T. Wobrock, Detroit, Mich., assignor to General Motors Corporation, Detroit, Mich., a corporation of Delaware Application May 21, 1954, Serial No. 431,367

7 Claims. (Cl. 192—68)

This invention relates to clutch mechanisms generally and more particularly to strap drive clutch mechanisms for use with automotive vehicles and the like.

Clutch mechanisms employed in automotive vehicles and which are of the friction disc clutch plate type generally include a pressure plate adapted to urge a friction disc or plate into engagement with an engine driven flywheel for the transmission of vehicle driving power. The pressure plate member is required to be driven by the flywheel, to be centered relative to the flywheel and to be axially movable for engaging and disengaging the frictional elements from the flywheel member. One well known means of connecting the pressure plate to the flywheel is by straps or plates secured between the flywheel cover and pressure plate member. Resilient drive strap means have been employed for providing axial flexibility of the pressure plate member. The number and disposition of drive straps to adequately support and center the pressure plate relative to the flywheel varies though at least three are preferable. The disposition of such drive straps, the manner in which they are disposed between the pressure plate and flywhel cover, the accessibility of the drive strap for inspection and repair, and other similar matters are all to be considered in providing a satisfactory strap drive clutch.

It is now proposed to provide a friction disc strap drive clutch which is appreciably more satisfactory in operation and ease of manufacture than previous similar devices. It is proposed to support and center the pressure plate of the present clutch assembly upon at least three chordally disposed laterally flexible drive straps secured between the pressure plate and the flywheel cover. The straps are to be secured to outer peripheral protrusions or bosses formed on the pressure plate to enable the positioning of the straps further outwardly on the pressure plate and consequently allow engagement of diaphragm spring means with the plate at a greater distance from the fulcruming or pivotal securement of the spring means for greater ease in axially moving the pressure plate. The disposition of the drive straps is further adapted to be sufficiently beyond the engaged portion of the pressure plate to obviate interference with the diaphragm spring during axial movement of the pressure plate.

It is further proposed to provide a more satisfactory circulation of air through the clutch assembly. Heretofore numerous apertures have been formed in the flywheel cover or housing members which have inadvertently diverted considerable air passing through the clutch assemblies prior to the effective circulation of the air about the pressure plate and clutch plate members for cooling such members. Such apertures have been formed in the face and sides of the flywheel cover for access to retainer springs, bolts, straps and the like. The proposed structure requires a bare minimum of such apertures which are formed in the face of the flywheel cover, and which still enable inspection and adjustment of the drive straps, drive strap securing means, spring retainers and diaphragm spring. The flywheel cover is further provided with a plurality of openings between each adjacent portion of the cover secured to the flywheel and beyond the outer peripheral extremity of the pressure plate and clutch plate members for more efficient circulation of air about the pressure plate, flywheel and clutch plate members.

A still further object of this invention is to provide a clutch assembly more easily manufactured and assembled at a lesser cost in materials and labor. The flywheel cover may be readily stamped from sheet material and includes a minimum number of apertures required to be formed therein. A minimum number of tapped holes for bolt means are required to be provided in the pressure plate and all such holes are in one face thereof. A minimum number of bolt means and spring clips are required; each bolt serving a multiple purpose. The assembly of the pressure plate to the flywheel cover with drive straps and diaphragm spring secured thereto is facilitated by the access openings in the flywheel cover enabling insertion of the bolts and spring clip means therethrough.

The proposed clutch assembly is inexpensive, adaptable for mass production, readily and easily assembled, and is highly efficient in operation and performance.

Figure 1:
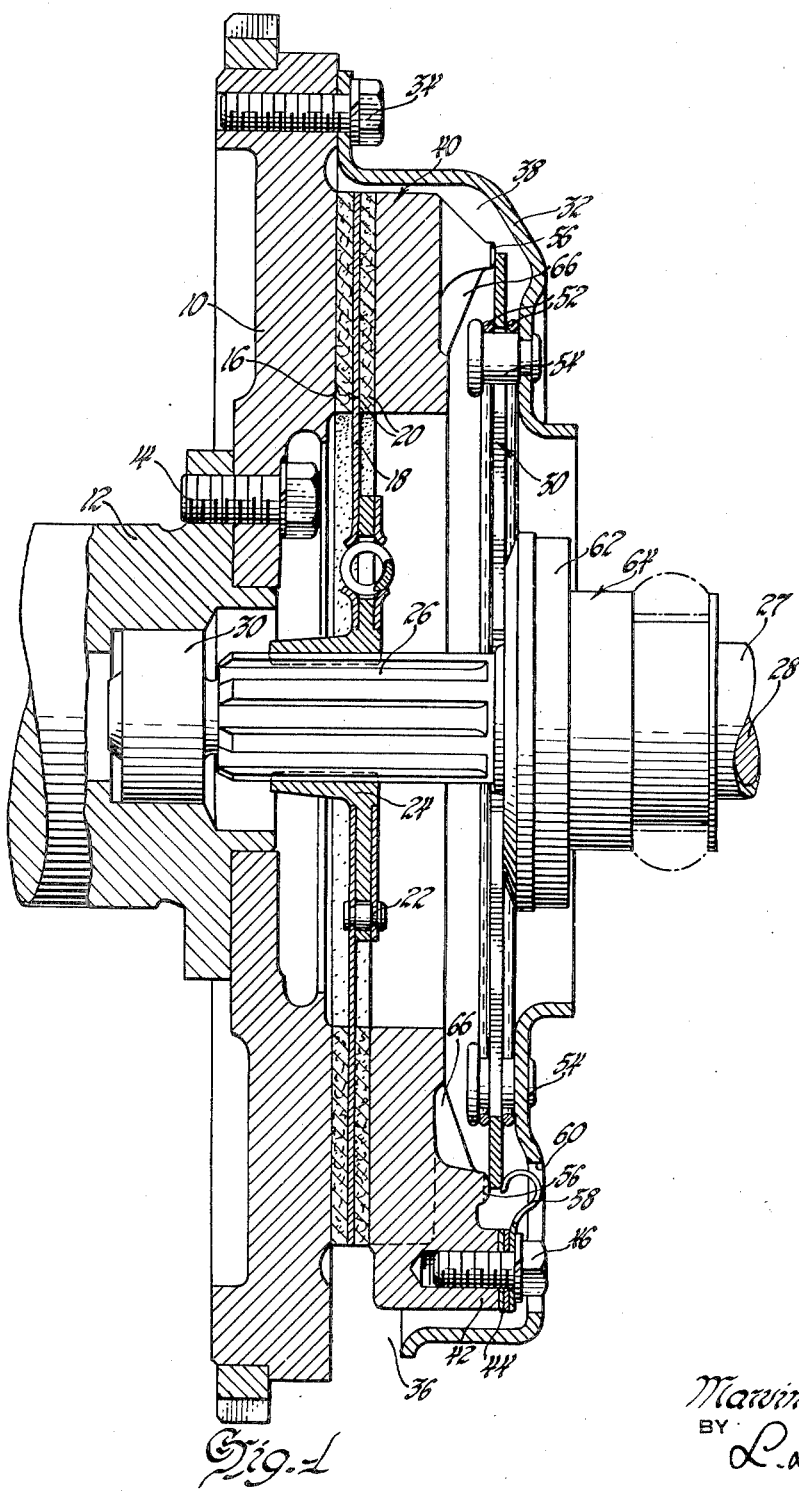
Figure 1 is an enlarged cross sectional view of the proposed clutch assembly shown in Figure 2 and taken substantially in the plane of line 1—1 therethrough and looking in the direction of the arrows.
Figure 2:
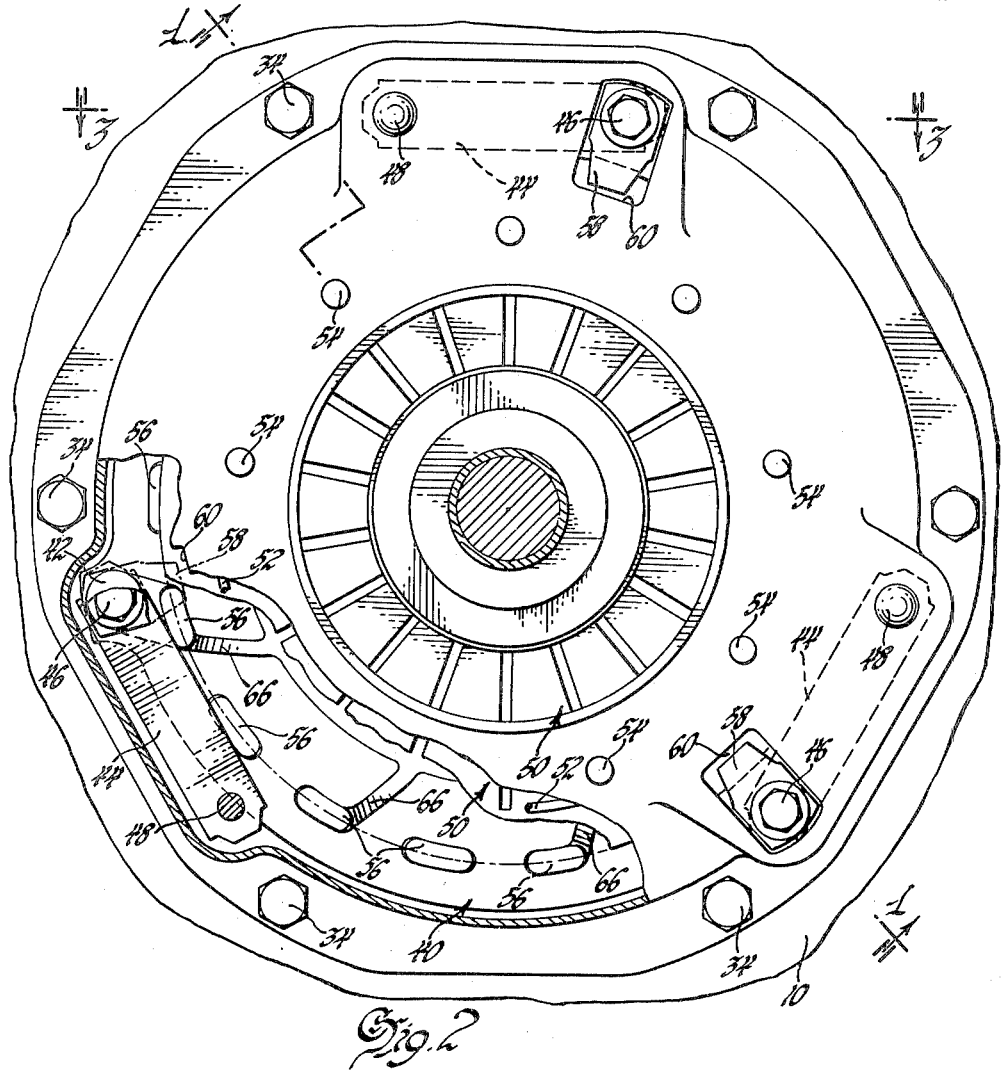
Figure 2 is a front view of the clutch assembly having parts broken away for a more detailed showing thereof.
Figure 3:
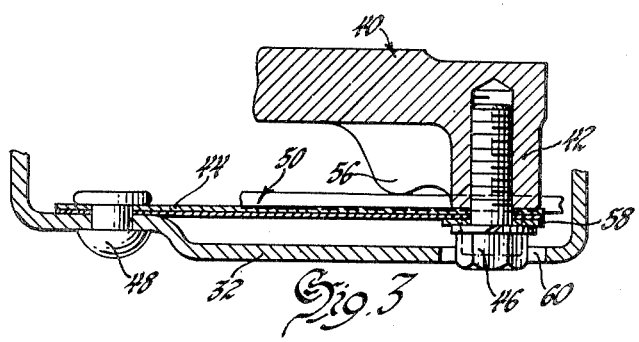
Figure 3 is an enlarged cross-sectional view of the strap drive employed in the proposed clutch assembly taken in the plane of line 3—3 of Figure 2 looking in the direction of the arrows thereon.

The proposed clutch mechanism includes a flywheel member 10 which is secured to an engine crankshaft 12 as by bolts 14. The flywheel includes an annular surface 16 adjacent which is disposed a clutch driven plate 18 having frictional facings 20 on opposite sides thereof. The clutch driven plate 18 is secured as at 22 to a splined sleeve 24 engaging a splined portion 26 of a shaft 28 adapted to be driven. The shaft 28 is journaled at its outer end within the engine crankshaft 12 as at 30. The clutch driven plate 18 is axially movable upon the end of the shaft 28 by means of the splined connection 26 therewith.

A housing or cover member 32 is secured to the flywheel 10 at the outer periphery thereof by bolts 34 circumferentially spaced therearound. The cover 32 engages the flywheel 10 only at the portion of the cover around the bolt connections and is alleviated between adjacent bolts to provide a plurality of circumferentially disposed openings 36 between the flywheel and the forward edge of the cover. The flywheel cover 32 is cupped outwardly from the flywheel 10 to form a chamber 38 within which is disposed the clutch driven plate 18 and a pressure plate member 40.

The pressure plate member 40 is annular in shape and has three radially disposed and circumferentially spaced peripheral bosses or projections 42 by means of which the pressure plate is adapted to be secured to the flywheel cover 32. Flexible drive straps 44 are secured by bolt means 46 to the projections 42 and by rivet means 48 to the flywheel cover 32. The drive straps 44 are extended chordally across the pressure plate 40.

A Belleville type spring member 50 is secured to the flywheel cover inwardly of the drive straps 44. The diaphragm type spring 50 is disposed intermediate two pivot rings 52 and is retained to the cover member 32 with the pivot rings upon a plurality of circumferentially disposed pivot ring retaining rivets 54. The outer periphery of the diaphragm spring 50 engages outwardly extended projections 56 formed on the rearward face of the pressure plate 40 and annularly spaced therearound.

A spring clip 58 is secured to the pressure plate 40 by the bolt means 46 retaining the driving straps 44 thereto and is itself adapted to retain the outer periphery of the diaphragm spring 50 against the projections 56 formed on the pressure plate. The pressure plate 40 is thereby adapted to be moved in conformance with movement of the outer periphery of the diaphragm spring 50. Three such spring members 58 are employed, each retained to the pressure plate 40 by one of the strap retaining bolt means 46. An aperture 60 is provided in the cover plate 32 adjacent each bolt 46 and spring clip 58 for greater ease of inspection, adjustment, and repair thereof.

A collar 62 of the clutch throwout bearing 64 which is slidable upon a retainer sleeve 27 about the driven shaft 28 is adapted to engage the inner periphery of the diaphragm spring 50. When the throwout bearing 64 is moved inwardly towards the flywheel 10 the outer periphery of the diaphragm spring 50 is flexed or pivoted rearwardly of the flywheel drawing with it by means of the spring clips 58 the pressure plate 40. The pressure plate 40 is thereby disengaged from the clutch driven plate 18 and the friction facing 20 of the clutch plate in turn disengaged from the flywheel 10.

In operation the pressure plate 40 normally holds the friction facings 20 of the clutch plate 18 in engagement with the flywheel 10 for transmitting the flywheel drive to the shaft 28. The chordally disposed drive straps 44 center the pressure plate 40 with respect to the flywheel 10 and their flexibility enables ease of axial movement thereof for urging the clutch driven plate 18 in or out of engagement with the flywheel. The three drive straps 44 further rigidly support the pressure plate 40 in such centered disposition. The radial protrusions or bosses 42 formed on the pressure plate 40 enable the drive straps 44 to be secured thereto outwardly of the projections 56 engaged by the diaphragm spring 50. The straps 44 being chordally disposed across the pressure plate 40 are disposed sufficiently outward of the annularly arranged projections 56 to prevent interference therewith during the axial movement of the pressure plate. The peripheral protrusions 42 further enable a maximum annular surface to be provided on the pressure plate 40 for engagement with the clutch plate facing 20. The outward disposition of the drive straps 44 further enables provision of a greater lever arm relative to the diaphragm spring 50 whereby the spring may more easily move the pressure plate 40 through a greater distance or with more pressure apply force.

The web formation 66 formed on the back of the pressure plate 40 integrally with the annularly spaced projections 56 thereon is adapted to assist the circulation of air through the flywheel cover chamber 38 and outwardly through the openings 36 formed between the flywheel cover 32 and the flywheel 10 after the air has passed over the pressure plate 40 and clutch driven plate 18. The rotation of the pressure plate 40 thereby assists the circulation of cooling air through the flywheel chamber 38 for efficient cooling of the flywheel 10, pressure plate 40 and clutch plate 18.

The diaphragm spring 50 and pivot rings 52 are secured to the pivot ring retaining rivets 54 and the drive straps 44 are riveted thereto prior to assembly of the cover 32 with the flywheel 10. The pressure plate 40 is readily secured to the drive straps 44 by bolts 46 and the spring clips 58 are engaged with the diaphragm spring 50 through the access apertures 60 formed in the cover 32. The clutch assembly may thereafter be secured to the flywheel 10 and over the shaft 28 and clutch plate 18 in position for operation.

I claim:

1. A clutch assembly including a flywheel cover adapted to be secured to a flywheel member and having a diaphragm spring and pressure plate means secured thereto, said pressure plate including annularly arranged projections formed near the outer periphery of one face thereof and having radial projections formed on the outer periphery thereof, and laterally flexible drive straps secured to said radial projections and extended chordally across said pressure plate outwardly of said annular projection for securement to said flywheel cover, said pressure plate being adapted to be rotated with said flywheel through said cover and drive straps and being adapted to be axially movable by said diaphragm spring for engaging frictional clutch plate means adapted to be disposed between said flywheel and pressure plate for the transmitting of flywheel rotation to a rotatable shaft adapted to be connected to said clutch plate means.

2. A clutch assembly including a flywheel cover adapted to be secured to a flywheel member and having a diaphragm spring and pressure plate means secured thereto, said pressure plate including annularly arranged projections formed near the outer periphery of one face thereof and having radial projections formed on the outer periphery thereof, and laterally flexible drive straps secured to said radial projections and extended chordally across said pressure plate for securement to said flywheel cover, said pressure plate being adapted to be rotated with said flywheel through said cover and drive straps and being adapted to be axially movable by said diaphragm spring for engaging frictional clutch plate means adapted to be disposed between said flywheel and pressure plate for the transmission of flywheel rotation to a rotatable shaft adapted to be connected to said clutch plate means, said drive straps being disposed outwardly of said annular projections free from interference with said diaphragm spring during the axial movement of said pressure plate and for allowing maximum radially outward engagement of said diaphragm spring with said pressure plate.

3. A clutch assembly including a flywheel cover adapted to be secured to a flywheel member, pressure plate means disposed within said cover and adapted to be secured thereto, said pressure plate having a plurality of projections formed near the outer periphery of one face thereof, diaphragm spring means secured to said cover and having the outer periphery thereof engaging said projections, radial bosses formed and circumferentially spaced about the periphery of said pressure plate, laterally flexible drive straps secured to said bosses and extended chordally across said pressure plate outwardly of said projections for securement to said cover, and a rotatable shaft adapted to have frictional clutch plate means connected thereto and disposed between said pressure plate and said flywheel, said diaphragm spring means holding said clutch plate means engaged between said flywheel and pressure plate and for transmitting the drive forces of said flywheel through said clutch plate means to said rotatable shaft.

4. A clutch assembly including a flywheel cover adapted to be secured to a flywheel member, pressure plate means disposed within said cover and adapted to be secured thereto, said pressure plate having a plurality of annularly arranged projections formed thereon and near the outer periphery of one face thereof, diaphragm spring means secured to said cover and having the outer periphery thereof engaging said annularly arranged projections, means for retaining said diaphragm spring in engagement with said pressure plate, radial projections formed and circumferentially spaced about the periphery of said pressure plate, laterally flexible drive straps secured to said radial projections and extended chordally across said pressure plate outwardly of said annularly arranged projections for securement to said cover, and a rotatable shaft adapted to have frictional clutch plate means connected thereto and disposed between said pressure plate and said flywheel, said diaphragm spring means holding said clutch plate means engaged between said flywheel and pressure plate and for transmitting the drive forces of said flywheel through said clutch plate means to said rotatable shaft.

5. In a clutch assembly including a flywheel cover adapted to be secured to a flywheel member and having diaphragm spring means secured thereto and frictional clutch plate means adapted to be disposed therewithin, a pressure plate adapted to be secured to said flywheel cover and to be engaged by said diaphragm spring means, said pressure plate including a plurality of annularly arranged projections formed near the outer periphery of one face thereof and adapted to be engaged with the outer periphery of said diaphragm spring means, said pressure plate being adapted for axial movement by said spring means for engaging said clutch plate means between said flywheel and said pressure plate, and radially extended and circumferentially spaced projections formed on the peripheral edge of said pressure plate, said radial projections being adapted to receive one end of lateral flexible drive straps secured to said cover and extended chordally across said pressure plate beyond said annularly arranged projections for supporting and driving said pressure plate with said cover and for allowing axial movement thereof free of interference by said drive straps with said diaphragm spring.

6. In a clutch assembly, a flywheel cover adapted to be secured to a flywheel member and having diaphragm spring means secured thereto and frictional disc means adapted to be disposed therewithin, a pressure plate adapted to be secured to said flywheel cover, spring clip means for holding said pressure plate to said diaphragm spring, strap means secured to said cover member and pressure plate and extended chordally therebetween, said pressure plate having no more than three bolt means secured therein for securement of said strap means and said spring clip means thereto, and said cover member having no more than three access apertures formed therethrough, said access apertures being disposed adjacent said bolt and spring means, said peripheral openings provided between said cover member and said flywheel intermediate each portion of said cover secured to said flywheel, said pressure plate being centered and supported by said drive straps and being adapted for axial movement by said diaphragm spring for engaging said frictional disc means between said pressure plate and flywheel for the transfer of flywheel rotation thereto, the rotation of said pressure plate with said flywheel through said drive straps circulating air through said cover for cooling said flywheel, friction disc means and pressure plate and directing said air through said peripheral openings.

7. A pressure plate for use in a friction drive clutch mechanism including a flywheel member having a cover member secured thereover, said cover member including diaphragm spring means adapted to engage said pressure plate for axial movement thereof for engaging a frictional clutch disc between said pressure plate and said flywheel, said cover having laterally flexible drive straps secured thereto and chordally disposed across said pressure plate, annularly arranged projections formed near the outer periphery of one face of said pressure plate and radial projections formed on the outer periphery thereof, the outer periphery of said diaphragm spring being adapted to engage said radial projection, spring clip means secured to said one face of said pressure plate for retaining said diaphragm spring in engagement with said annularly arranged projections, and single bolt means for securing one of said drive straps and one of said spring clip means to said one face of said pressure plate within each one of said radial projections, said cover plate having an opening formed therein adjacent each of said bolt means for access thereto, said radial projections enabling maximum use of the other face of said pressure plate for engagement with said clutch plate and enabling the engagement of said diaphragm spring nearer the peripheral edge of said pressure plate.

References Cited in the file of this patent
UNITED STATES PATENTS

| | | |
|---|---|---|
| 2,100,464 | Almen et al. | Nov. 30, 1937 |
| 2,183,001 | Wolfram | Dec. 12, 1939 |
| 2,270,467 | Nutt | Jan. 20, 1942 |
| 2,277,221 | Gamble | Mar. 24, 1942 |
| 2,277,557 | Nutt | Mar. 24, 1942 |
| 2,359,104 | Geyer | Sept. 26, 1944 |
| 2,366,643 | Nutt | Jan. 2, 1945 |
| 2,672,226 | Zeidler | Mar. 16, 1954 |